US011377527B2

(12) United States Patent
Moran et al.

(10) Patent No.: US 11,377,527 B2
(45) Date of Patent: Jul. 5, 2022

(54) FIBER REINFORCED POLYMER MANUFACTURING

(71) Applicant: RUAG SCHWEIZ AG, Zürich (CH)

(72) Inventors: Joseph Patrick Moran, Winkel (CH); Michael Stephen Pavloff, Wädenswil (CH)

(73) Assignee: RUAG SCHWEIZ AG, Zurich (CH)

( * ) Notice: Subject to any disclaimer, the term of this patent is extended or adjusted under 35 U.S.C. 154(b) by 395 days.

(21) Appl. No.: 16/342,177

(22) PCT Filed: Oct. 27, 2017

(86) PCT No.: PCT/EP2017/025322
§ 371 (c)(1),
(2) Date: Apr. 15, 2019

(87) PCT Pub. No.: WO2018/077482
PCT Pub. Date: May 3, 2018

(65) Prior Publication Data
US 2019/0233598 A1    Aug. 1, 2019

(30) Foreign Application Priority Data

Oct. 27, 2016    (CH) ...................................... 1443/16

(51) Int. Cl.
*C08J 5/04* (2006.01)
*B29C 70/88* (2006.01)
(Continued)

(52) U.S. Cl.
CPC ........... *C08J 5/042* (2013.01); *B29C 35/0272* (2013.01); *B29C 45/0001* (2013.01);
(Continued)

(58) Field of Classification Search
CPC ........... Y10T 428/249921; Y10T 428/249942; D04H 3/12; B29K 2707/04;
(Continued)

(56) References Cited

U.S. PATENT DOCUMENTS

| 4,385,957 A | * | 5/1983 | Wackerle | ............ B29C 35/0272 |
| | | | | 156/273.9 |
| 2013/0130583 A1 | * | 5/2013 | Bjornhov | ................ B29C 70/50 |
| | | | | 442/218 |

FOREIGN PATENT DOCUMENTS

| EP | 0022919 A2 | 1/1981 |
| JP | S5613135 A | 2/1981 |

(Continued)

OTHER PUBLICATIONS

International Search Report and Written Opinion for related International Application No. PCT/EP2017/025322; dated Jan. 24, 2018; 16 pages.

(Continued)

*Primary Examiner* — Camie S Thompson
(74) *Attorney, Agent, or Firm* — Procopio, Cory, Hargreaves & Savitch, LLP

(57) ABSTRACT

Method of manufacturing a product comprising fiber reinforced polymer material, the method comprising the steps of:
  providing 10 carbon fibers being embedded in a thermosetting resin,
  heating 20 the thermosetting resin up to its cure temperature by a current flowing through at least a part of said carbon fibers,
  letting convert 30 the thermosetting resin to a thermoset polymer.

(Continued)

Figure 1:
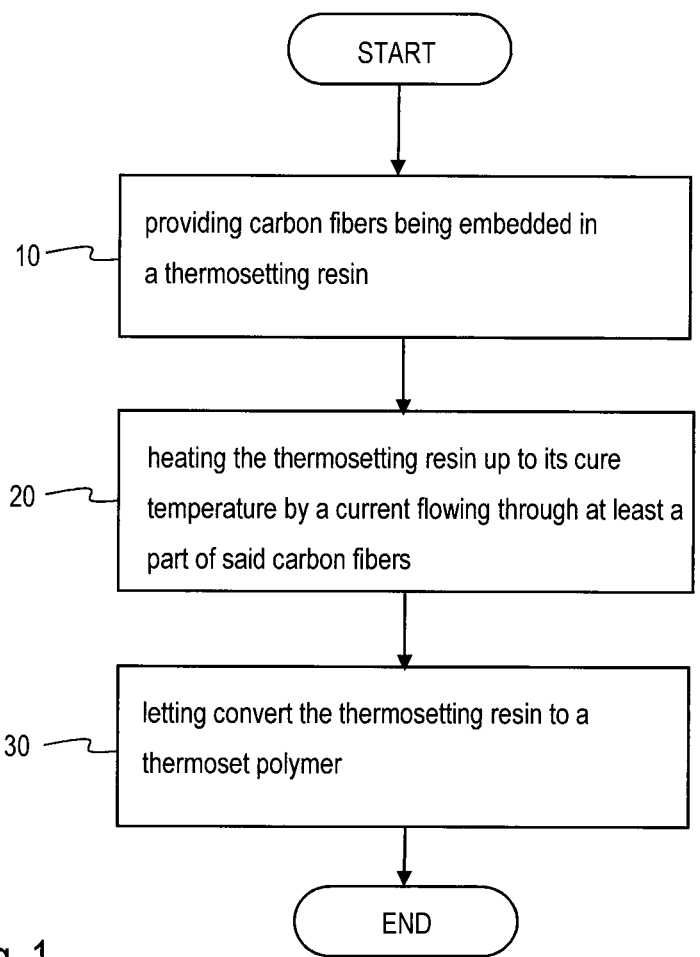

The invention is further directed to a device for performing the method and to a composite sandwich panel structure manufactured according to the method.

23 Claims, 5 Drawing Sheets

(51) Int. Cl.

| | | |
|---|---|---|
| *B29C 35/02* | (2006.01) | |
| *B29C 45/00* | (2006.01) | |
| *B29C 70/08* | (2006.01) | |
| *B29C 70/30* | (2006.01) | |
| *B32B 27/18* | (2006.01) | |
| *B32B 27/28* | (2006.01) | |
| *B29K 101/10* | (2006.01) | |

(52) U.S. Cl.
CPC ............ *B29C 70/083* (2013.01); *B29C 70/30* (2013.01); *B29C 70/882* (2013.01); *B32B 27/18* (2013.01); *B32B 27/28* (2013.01); *C08J 5/041* (2013.01); *B29C 2035/0211* (2013.01); *B29K 2101/10* (2013.01); *B32B 2262/103* (2013.01); *B32B 2262/106* (2013.01); *B32B 2307/202* (2013.01); *B32B 2457/00* (2013.01)

(58) Field of Classification Search
CPC ... B29K 2101/10; B29C 70/48; B29C 70/285; B29C 35/0272; C08J 5/042; B32B 2262/106; B32B 2307/202; B32B 27/28; H05B 3/36; H05B 2203/011; H05B 2203/016; H05B 2203/017; H05B 2203/033
USPC .............. 264/405, 105, 165; 428/221, 298.1, 428/299.1; 427/545; 29/611; 265/105; 219/544, 545; 156/273.9
See application file for complete search history.

(56) References Cited

FOREIGN PATENT DOCUMENTS

| | | | |
|---|---|---|---|
| JP | S6044328 A | 3/1985 | |
| JP | H1 1283731 A | 10/1999 | |
| JP | 2007015385 A | 1/2007 | |
| JP | 2008068487 A | 3/2008 | |
| WO | 95/26877 A1 | 10/1995 | |
| WO | 01/78957 A2 | 10/2001 | |
| WO | 2004/003096 A1 | 1/2004 | |

OTHER PUBLICATIONS

International Preliminary Report on Patentability for related International Application No. PCT/EP2017/025322; dated May 9, 2019; 10 pages.

* cited by examiner

FIBER REINFORCED POLYMER MANUFACTURING

CROSS-REFERENCE TO RELATED APPLICATIONS

This application is a U.S. National Stage entry of PCT Application No: PCT/EP2017/025322 filed Oct. 27, 2017, which claims priority to Swiss Patent Application No. 01443/16, filed Oct. 27, 2016, the contents of which are incorporated herein by reference.

The invention addressed herein relates to a method of manufacturing a product comprising fiber reinforced polymer material. Under further aspects, the invention relates to a device for performing the method and to a composite sandwich panel structure manufactured according to the method.

Fiber reinforced polymers are a known class of composite materials. The constituents of fiber reinforced polymer (FRP) materials are a polymer, which forms the matrix, and fibers, which form the reinforcement. The polymer surrounds the fibers and stabilizes their relative position. The fibers provide the composite material, among other properties, with improved stiffness and tensile strength. Known manufacturing methods for products comprising fiber reinforced polymer material involve arranging of fibers in a desired geometric form, soaking or impregnating the fibers with a resin and curing the resin. At the end of the curing process the resin is converted into the polymer matrix. A typical resin used in such a manufacturing process is epoxy resin. Depending on the resin used, several possibilities for initiating the curing process are possible. A widespread way of curing is thermal curing, i.e. heating the resin to a temperature at which polymerization takes place. In the case of epoxy resins, this cure temperature is about 180° C. The curing process is typically performed in an oven. In some cases the application of high pressure or of vacuum may be required, such that the process needs to be performed in an autoclave. A former or a mold holds the fibers and the resin in the desired geometric form until the polymer is cured and gives stability to the resulting product. The former or the mold are put into the oven together with the fibers soaked in resin. Such formers or molds are typically made of steel or aluminum, as they should provide mechanical stability, should withstand temperatures around the cure temperature of the resin and should not impede heat flowing from oven into the resin.

The object of the present invention is to provide an improved method of manufacturing a product comprising a fiber reinforced polymer.

This object is achieved by a method according to claim 1.

The method according to the present invention is a method of manufacturing a product comprising fiber reinforced polymer material. The method comprises the following steps:

First, carbon fibers being embedded in a thermosetting resin are provided;

Second, the thermosetting resin is heated up to its cure temperature by a current flowing through at least a part of the carbon fibers;

Third, the thermosetting resin is converted to a thermoset polymer.

The inventors have recognized that by applying carbon fibers as reinforcing element, it becomes possible to directly heat the workpiece by applying an electrical current to the carbon fibers. Carbon fibers are sufficiently electrically conductive to allow resistance heating by letting a current flow through them. The resulting product comprises carbon fiber reinforced polymer (CFRP) material. Other types of fibers, including electrically isolating fibers such as glass fibers, may be combined with the carbon fibers. As the thermosetting resin is in close proximity to the carbon fibers, the heat created in the carbon fibers arrives directly at the place where it is needed to cause the conversion from resin to polymer. Thus, the method according to the invention requires less power than a conventional thermal curing process in an oven.

With the method according to the invention, no oven in the conventional sense is needed at all. This may lead to significant reduction in manufacturing cost. Especially in case of manufacturing large products, e.g. products having dimensions of several meters, the method increases the flexibility in selecting a place for manufacturing, as no oven of adequate size needs to be available. With the method according to the invention, the carbon fibers embedded in thermosetting resin can be brought into the desired shape and then the composite material can be cured in-situ. Thus, the method could be seen as a method of manufacturing of a self-heating CFRP workpiece.

As the carbon fibers have low weight and excellent mechanical properties, including them as heating elements into the workpiece has no adverse effect on other properties that are particularly desirable in lightweight construction. They can fulfill the function of a heating component as well as the function of a structural element.

Not all carbon fibers provided in the first step of the method need to be involved in the resistance heating. It may e.g. be sufficient to prepare one layer of carbon fibers extending over a surface of the product to be connected to a current source.

Depending on the thermosetting resin used and the dimensions of the product, a specific curing cycle involving temperature ramps and temperature plateaus in a predefined time-sequence may be applied. Temperature sensors may be arranged in the resin or its proximity in order to monitor temperature conditions or to control the temperature by a negative feedback loop acting onto the heating current applied.

The heating process may be divided into several sub-heating processes until completing of the polymerization.

Further embodiments of the method according to the invention result from the features of the claims 2 to 18.

In one embodiment of the method according to the invention, which may be combined with any of the embodiments still to be addressed unless in contradiction, the method further comprises the preceding step of arranging the carbon fibers on a surface of a former or in a mold defining a shape of the product.

While heating the thermosetting resin up to its cure temperature, typically at some intermediate temperature the resin has low viscosity leading to low stability of the not yet cured composite material. A former or a mold provide the necessary stability in this phase of the manufacturing process.

In one embodiment of the method according to the invention, which may be combined with any of the preaddressed embodiments and any of the embodiments still to be addressed unless in contradiction, after heating the thermosetting resin up to its cure temperature, a structure comprising carbon fibers and partially cured resin is removed from the former or the mold.

With this embodiment, the same former or mold can be used more often. Once the structure of carbon fibers and partially cured resin has acquired some stability of its own, the method according to the invention provides the previously unknown possibility, of heating the workpiece independently of an oven and independently of a former or a mold by letting flow a current through the carbon fibers. This way, the remaining conversion of the thermosetting resin to a thermoset polymer can be completed in a separate step of the method, without needing a former or mold. After being removed from the former or the mold, the structure comprising carbon fibers and partially cured resin may be heated up to a temperature that would not be allowed while the structure is in contact with the former or the mold, because such a temperature could compromise the integrity of the former or the mold. Such a post cure step applying high temperatures may be useful to impart better high temperature properties to the final carbon fiber reinforced polymer product. A simple support structure, e.g. a metal frame supporting or defining the position of interface points or surfaces, may be applied instead of the former or the mold in later stages of the process.

In one embodiment of the method according to the invention, which may be combined with any of the preaddressed embodiments and any of the embodiments still to be addressed unless in contradiction, the carbon fibers are pre-impregnated by the thermosetting resin before arranging them on the surface of the former or in the mold.

Carbon fibers being pre-impregnated by the thermosetting resin, known as prepregs, are commercially available as semi-finished goods. The resin may already be partially cured, giving the prepregs some stability and allowing easy handling.

In one embodiment of the method according to the invention, which may be combined with any of the preaddressed embodiments and any of the embodiments still to be addressed unless in contradiction, after arranging the carbon fibers in the mold, thermosetting resin is injected into the mold.

It is possible to add the thermosetting resin only after the carbon fibers have been arranged in a mold or, in case pre-impregnated fibers have been used, to add additional resin, e.g. to fill empty spaces. Precisely defined geometrical shapes can be achieved by using a mold and injecting thermosetting resin.

In one embodiment of the method according to the invention, which may be combined with any of the preaddressed embodiments and any of the embodiments still to be addressed unless in contradiction, the method further comprises the step of providing the former or the mold comprising thermally insulating material, in particular wood, cork, ceramics, glass, mineral wool, polymer foam, and/or covering the former or the mold with a multilayer insulation.

Using a former or a mold comprising thermally insulating material has the advantage of keeping heat for a longer time in the workpiece. As in the method according to the invention the workpiece heats itself, a former or a mold comprising thermally insulating material helps to reduce the total energy needed to cure the resin. In order to run a predefined temperature ramp defined by the steepness of its slope, lower power is needed if the former or the mold comprise thermally insulating material. Surrounding the former or the mold with additional insulating elements, such as a multilayer insulation further reduces total energy consumption and electric power needed.

A former or a mold built of wood, e.g. plywood, has the additional advantage of being cheap, being easily workable and having a small $CO_2$-footprint. In case of large products, wood has the further advantage that is often locally available in large quantities also in abroad regions. Wood can withstand temperatures corresponding to cure temperatures of typical resins, which lie around 120° C. to 200° C.

In one embodiment of the method according to the invention, which may be combined with any of the preaddressed embodiments and any of the embodiments still to be addressed unless in contradiction, the method further comprises the preceding step of bringing distant sections of the part of carbon fibers into electrically conducting contact with electrodes of a power supply.

The distant sections of the carbon fibers may be opposite ends of the carbon fibers involved in current heating. These ends may be lead out of a mold for contacting them to the electrodes and later be cut at the surface of the final product. Alternatively, contact areas to carbon fibers being arranged on a former or in a mold may be established at intermediate sections along the fibers. This way, only the part of the fibers in between the sections in contact with the electrodes are used for resistance heating.

The carbon fibers may be long enough such that single carbon fibers in the part of carbon fibers are in electrically conducting contact with both of two electrodes in distant sections. The current path from one electrode to another may as well be established via a multiplicity of carbon fibers having electrical contact among each other and forming a series connection from one electrode to another electrode. In the latter case, shorter carbon fibers may be used, in particular carbon fibers having a length that is smaller than the distance between the electrodes. Electrical contact between carbon fibers may be enhanced by twisting bunches of carbon fibers to form a yarn and/or by weaving carbon fibers in longitudinal and transversal direction to a fabric.

The electrodes of the power supply may e.g. be made of copper, a copper alloy, such as brass, or graphite. As electrode material, all form of electrically conductive or semi conductive material, be it metallic, organic or inorganic is conceivable.

The power supply may as well provide alternating current (AC) as direct current (DC). The power supply may comprise a controller or may be controlled by an external controller enabling open loop control or closed loop control of the power delivered or of a temperature. Such a controller may receive input signals from one or several temperature sensors arranged on the workpiece.

In one embodiment of the method according to the invention, which may be combined with any of the preaddressed embodiments and any of the embodiments still to be addressed unless in contradiction, the electrodes are clamped to the carbon fibers, in particular wherein said electrodes are of a solid bar construction.

By clamping an electrical connection to the electrodes with low contact resistance can be established. A previous cleaning of the contact area to the carbon fibers, e.g. by immersing the carbon fibers in a paint thinner, may be necessary to remove electrically isolating material from the carbon fibers. Such a cleaning step may or may not be necessary in case that pre-impregnated material is used. The electrodes may e.g. have the form of copper plates. With the electrodes having the form of a solid bar construction, high clamping forces may be applied and hence low contact resistance is achieved. This way, the voltage needed during the heating step can be kept low and local overheating at the contact faces to the electrodes can be avoided.

In one embodiment of the method according to the invention, which may be combined with any of the preaddressed embodiments and any of the embodiments still to be addressed unless in contradiction, the electrodes have the form of metallic filaments. The filaments are woven into a fabric comprising the carbon fibers. Preferably, the metallic filaments preferably are arranged in orthogonal direction to the carbon fibers.

The metallic filaments may e.g. be copper filaments. They may be woven across the width of a band of pre-preg fabric containing the carbon fibers in longitudinal direction. This way, good electrical contact over the whole width of the band, i.e. to all carbon fibers lying in longitudinal direction of the band is achieved.

In one embodiment of the method according to the invention, which may be combined with any of the preaddressed embodiments and any of the embodiments still to be addressed unless in contradiction, the carbon fibers are arranged in multiple plies and the plies are connected in parallel to the power supply.

By connecting several plies of carbon fibers in parallel to the power supply the effective cross section of the carbon fibers can be increased and the total resistivity between the electrodes can be reduced correspondingly. This way, the total resistivity may be adjusted such that the voltage that needs to be applied in order to reach a predetermined heating power lies in a suitable range for the power supply. E.g. the resistivity may be adjusted such that the voltage available from the power grid, such as 110V or 230V, is sufficient to drive the heating current; lower voltages may also be applied In one embodiment of the method according to the invention, which may be combined with any of the preaddressed embodiments and any of the embodiments still to be addressed unless in contradiction, the carbon fibers are provided in form of a band-shaped fabric comprising carbon fibers at least in a longitudinal direction.

Such a fabric or ply allows easy handling and arranging of the carbon fibers. The fabric may be pre-impregnated by a thermosetting resin. The band-shape of the fabric allows winding the carbon fibers on a mandrel or laying the carbon fibers on a former in an effective way. The electrical contacts may be established at the opposing ends of the band after winding or arranging the band. The band-shaped fabric may comprise carbon fibers in the longitudinal as well as in the transversal or a diagonal direction with respect to the band-shape. The fabric may be made completely from carbon fibers or it may comprise different fibers, such as glass fibers or metallic filaments, too.

In one embodiment of the method according to the invention, which may be combined with any of the preaddressed embodiments and any of the embodiments still to be addressed unless in contradiction, the method is used for manufacturing a laminate structure and the method comprises the step of arranging the band-shaped fabric or ply parallel to a surface of the laminate structure and covering the surface.

A laminate structure is a structure that mainly extends along a possibly curved surface and has several layers in a direction orthogonal to this surface. In the laminate structure the carbon fibers may be arranged in layers having different direction of fiber in order to achieve high mechanical oriented strength and or stiffness of the final product. In this embodiment, the band is arranged flat and parallel to the surface and the band is arranged in a way that along its path it covers the complete surface of the laminate structure. This way it can be assured that a uniform heating of the complete laminate structure is achieved in the curing step.

In one embodiment of the method according to the invention, which may be combined with any of the preaddressed embodiments and any of the embodiments still to be addressed unless in contradiction, the method is a method for manufacturing a composite sandwich panel structure.

The composite sandwich panel structure comprises a core between a first face sheet and a second face sheet, wherein at least one of the first face sheet and the second face sheet comprises carbon fibers embedded in thermoset polymer.

The composite sandwich panel structure manufactured according to the embodiment of the method, comprises a core having different structure or comprising different material than the two face sheets. The face sheets may consist of one layer each or may consist of multiple layers or may be built of multi-layer material. First and second face sheet may have a layer stack or structure being mirror symmetrical each other. First and second face sheet may be different from each other, be it in material, or dimension, such as thickness or number of plies. Different layers of the face sheets may consist of different materials. At least one of the face sheets comprises the carbon fibers, which are electrically heated in the heating step of the method. Thus at least one face sheet layer is electrically conductive.

In one embodiment of the method according to the invention, which may be combined with any of the preaddressed embodiments and any of the embodiments still to be addressed unless in contradiction, the at least one of the first face sheet and the second face sheet comprises an electrically insulating layer between the carbon fibers and the core and/or between the carbon fibers and an exterior of the composite sandwich panel structure.

An electrically insulating layer between the carbon fibers in one of the face sheets and the core may prevent electrical contact to an electrically conducting core. An electrically insulating layer between the carbon fibers in one of the face sheets and an exterior of the composite sandwich panel structure may prevent erroneously encountering components under voltage and may be necessary for safety reasons.

In one embodiment of the method according to the invention, which may be combined with any of the preaddressed embodiments and any of the embodiments still to be addressed unless in contradiction, the core of the composite sandwich panel structure is electrically non-conductive.

An electrical insulation layer, such as glass fiber ply or other inorganic ply between carbon fibers and the core might not be necessary in this embodiment. An electrically non-conductive core may e.g. comprise a dielectric substance. It may comprise or consist of organic material, such as a foamed plastic, wood, cork or the like. These materials enable lightweight construction. It may comprise or consist of inorganic material, such as ceramic or semi conductive material.

In one embodiment of the method according to the invention, which may be combined with any of the preaddressed embodiments and any of the embodiments still to be addressed unless in contradiction, the composite sandwich panel structure comprises at its surface electrical contact elements, the electrical contact elements being in electrical contact with the carbon fibers and being designed as solid bar constructions.

With this embodiment, high clamping forces may be applied to the electrical contact elements and thus low contact resistance can be achieved. This way, the voltage needed during the heating step can be kept low and local overheating at the contact faces to the electrodes can be avoided. For establishing contact to a power supply, removable electrodes connected to the power supply may be clamped to the electrical contact elements. Both counterparts, i.e. the electrical contact elements as well as the removable electrodes may be designed as solid bar constructions.

In one embodiment of the method according to the invention, which may be combined with any of the preaddressed embodiments and any of the embodiments still to be addressed unless in contradiction, the composite sandwich panel structure comprises at its surface electrical contact elements, the electrical contact elements being in electrical contact with the carbon fibers and the electrical contact elements comprising electrically conducting fibers.

The electrically conducting fibers may be metallic fibers, such as copper filaments. The electrically conducting fibers may be carbon fibers. The electrical contact elements may be arranged at structural interfaces, e.g. at structural interface rings. The electrical contact elements may or may not be part of the final ensemble. They may be used to form part of the electrode assembly for the application of the electrical current to the carbon fibers. The electrical contact elements may be removed after the conversion of thermosetting resin to a thermoset polymer.

In one embodiment of the method according to the invention, which may be combined with any of the preaddressed embodiments and any of the embodiments still to be addressed unless in contradiction, the composite sandwich panel structure comprises edge reinforcements built as monolithic construction comprising glass fibers and electrically conducting fibers.

In this embodiment, the edge reinforcement facilitates the clamping of the conductive face. It provides high mechanicals stability at critical regions together with the possibility to establish electrical connections directly at the edge reinforcements.

Further in the scope of the invention lies a device for performing the method according to the invention, as defined in claim 19. The device comprises
 a former or a mold comprising thermally and electrically insulating material,
 electrodes for connecting the carbon fibers to a power supply, the electrodes being arranged on the former or in the mold.

Such a device is easy to handle tool for the manufacturing of a product comprising fiber reinforced composite materials. The electrodes may be integrated into the former or the mold to establish contact to the carbon fibers at predetermined positions on the surface of the former or the mold. The electrodes may e.g. be made of copper, a copper alloy, such as brass, or graphite. As electrode material, all form of electrically conductive or semi conductive material, be it metallic, organic or inorganic is conceivable.

The invention is further directed to a composite sandwich panel structure according to claim 20. It is a composite sandwich panel structure manufactured according to the method described in the present invention.

In an embodiment of the composite sandwich panel structure, the structure comprises an inner face sheet, a honeycomb structure and an outer face sheet, all of which comprising a thermoset polymer, wherein carbon fibers are arranged to follow a path uniformly covering the inner and/or the outer face sheet.

As the composite sandwich panel structure according to the invention comprises carbon fibers that uniformly cover at least one of the face sheets of the sandwich structure, these carbon fibers can be used to uniformly heat the whole structure for curing a thermosetting resin embedding the heated carbon fibers as well as thermosetting resin in the honeycomb structure and the other face sheet in order to convert the thermosetting resin into the thermoset polymer in the final composite sandwich panel. Thus, such a composite sandwich panel structure can be produced efficiently and in an energy saving way by the manufacturing method according to the invention.

Such composite sandwich panel structures may have the form of plates or of cylindrical, conical spherical surfaces or combinations thereof. They may be used in aerospace application, e.g. as outer shell of a plane or of payload fairings of a launch vehicle.

The inner face sheet may be the first face sheet or the second face sheet in the method already mentioned. Accordingly, the outer face sheet may be the other of the first face sheet and second face sheet. The role of the inner and outer face sheet is defined by the geometrical form or the application of the structure. The core having a honeycomb structure and being embedded between two face sheets is particularly suited for lightweight constructions, which must support high mechanical load.

Figure 2:
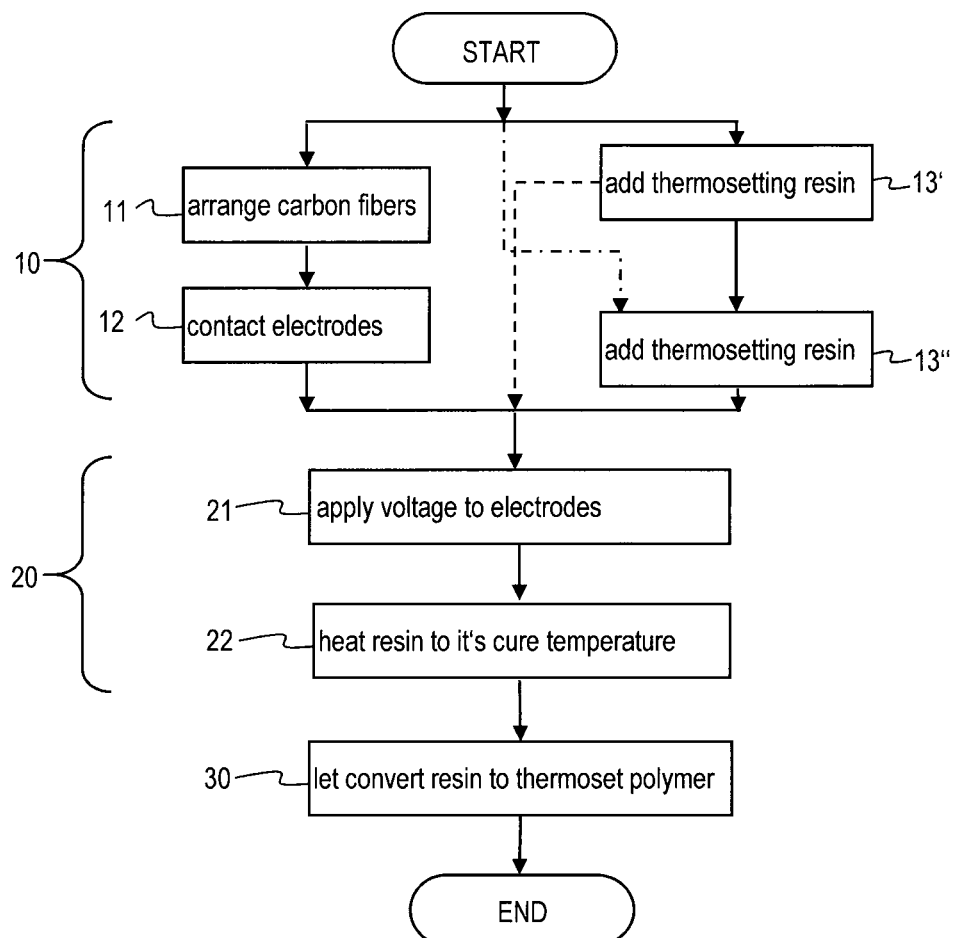
Figure 3:
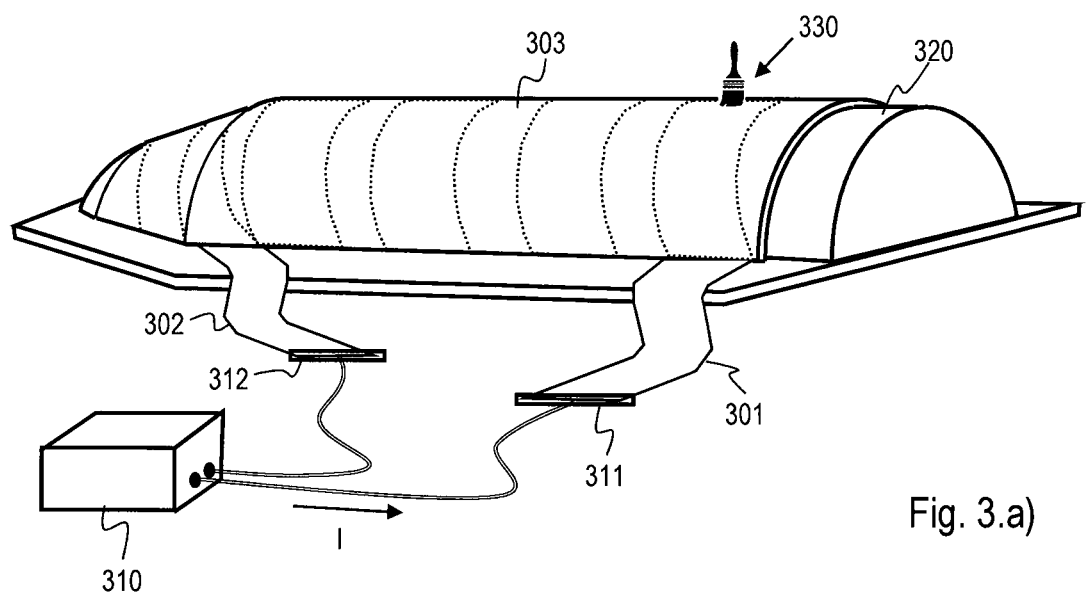
Figure 3:
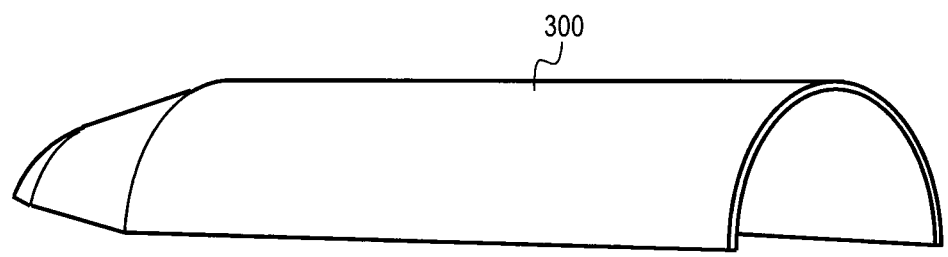
Figure 4:
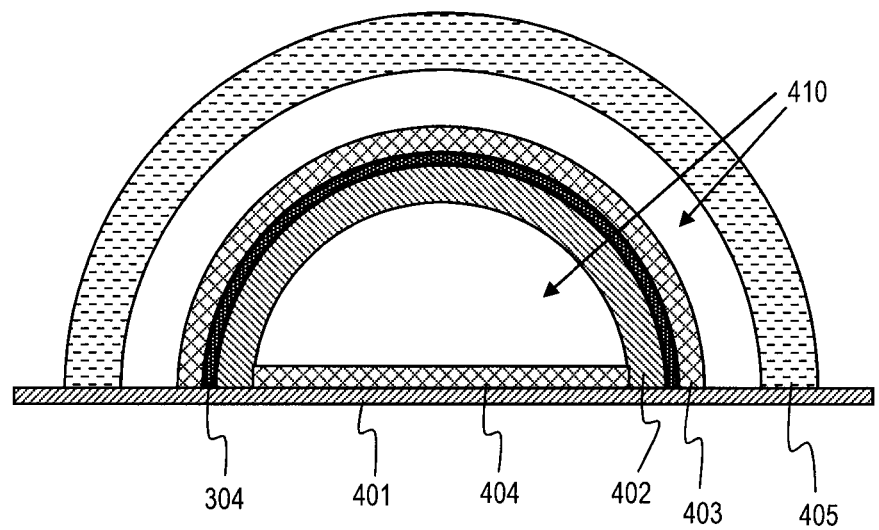
Figure 5:
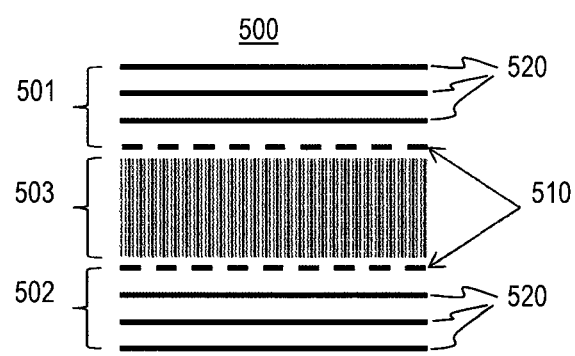
Figure 6:
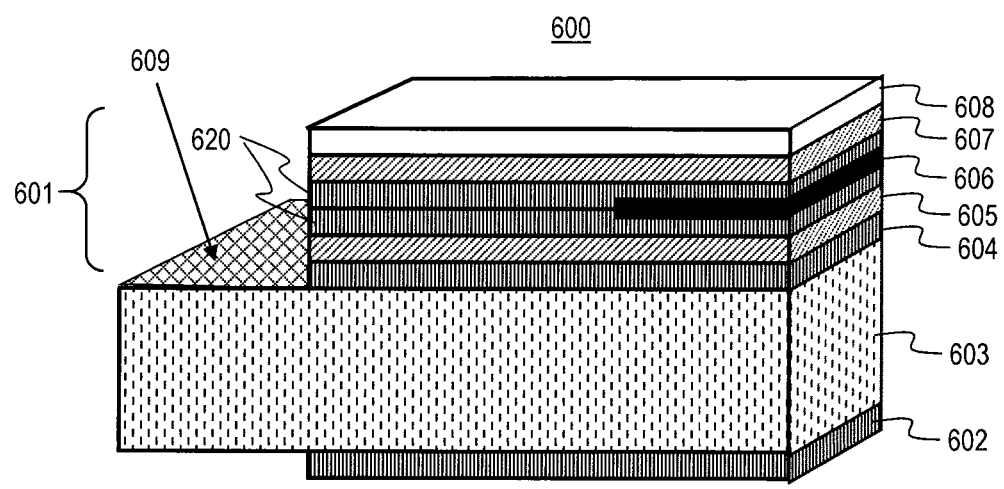
Figure 7:
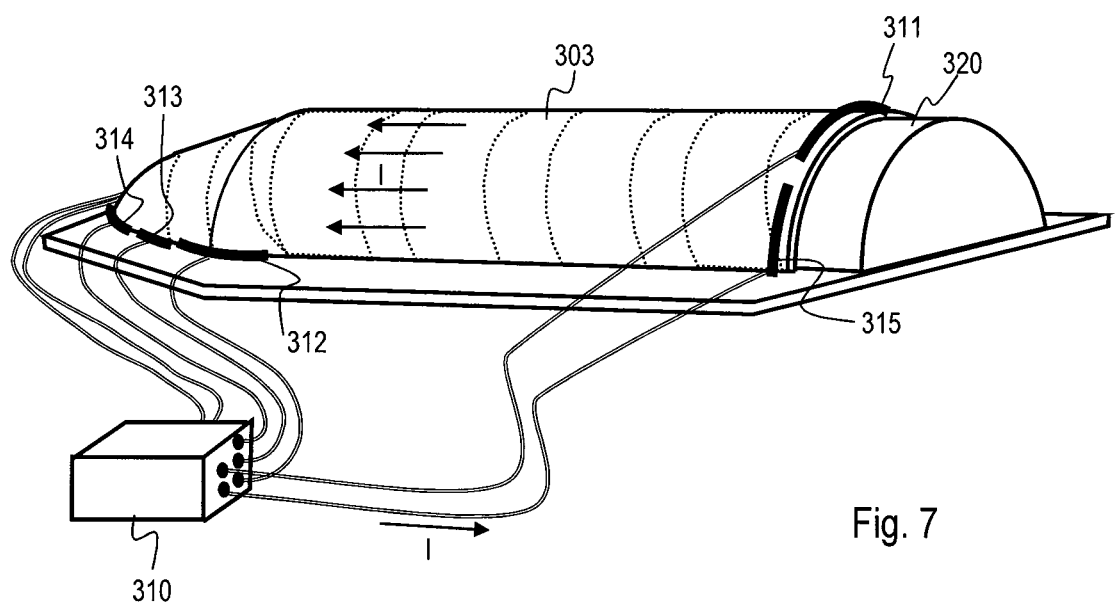

The invention shall now be further exemplified with the help of figures. The figures show:
 FIG. 1 a flow chart of the method according to the invention;
 FIG. 2 a flow chart of an embodiment of the method;
 FIG. 3.a) a perspective and schematic view of a product during manufacturing;
 FIG. 3.b) a perspective view of the product resulting after manufacturing as shown in FIG. 3.a);
 FIG. 4 a cross section through a mold and a workpiece;
 FIG. 5 a schematic cross section through a composite sandwich panel structure;
 FIG. 6 a cutout view of a composite sandwich panel structure;
 FIG. 7 a perspective and schematic view of a product during manufacturing.

FIG. 1 shows a flow chart of the method according to the invention. After starting the manufacturing method, the first step 10 consists in providing carbon fibers being embedded in a thermosetting resin. The second step 20 consists in heating the thermosetting resin up to its cure temperature by a current flowing through at least a part of said carbon fibers. In the third step 30 the thermosetting resin is converted to a thermoset polymer. The end of the procedure is reached when the polymerization is completed.

FIG. 2 shows a flow chart of an embodiment of the method, showing additional intermediate steps. Arranging the carbon fibers 11 on a former or in a mold can be performed independently of adding a thermosetting resin 13', 13" to the fibers to provide carbon fibers being embedded in thermosetting resin. In the chronological sequence, the adding of the thermosetting resin can take place before the arranging of the carbon fibers (as indicated with reference sign 13'), e.g. by using prepreg material or by wetting fibers during a winding process. It may be advantageous to add thermosetting resin after contacting the electrodes to the carbon fibers (as indicated with reference sign 13"), to avoid an additional cleaning step. Different possible sequences are indicated by continuous, dashed or dash-dotted arrows. By applying 21 a voltage to the electrodes contacted to the carbon fibers before, an electrical current starts to flow through the carbon fibers. By the resistive heating of the carbon fibers, heating 22 of the resin up to its cure temperature is performed. The thermosetting resin is kept on or above cure temperature for a time long enough to let convert 30 the resin to a thermoset polymer, i.e. to achieve complete polymerization. Before the step of letting convert 30 the thermoset resin completely, the workpiece at this time being a structure comprising the carbon fibers and partially cured resin may be removed from the former or the mold according to an embodiment of the method according to the invention.

FIG. 3.a) shows a perspective and schematic view of a product during the manufacturing method according to an embodiment. Carbon fibers embedded in thermosetting resin 303 are arranged on a former 320 which defines the geometric shape of the final product. A paintbrush 330 symbolically indicates the surface comprising resin. Painting this surface with resin is only one of several possibilities to provide carbon fibers embedded in thermosetting resin. Other means to apply resin to dry fabrics, such as through a spray nozzle, are an option, too. Pre-impregnated fiber, yarn, fabrics etc. may be used alternatively. Ends 301, 302 of a band-shaped fabric comprising carbon fibers protrude from the shape of the product and are clamped to electrodes 311, 312 which are connected to a power supply 310. A current I is flowing from one electrode through the carbon fibers to the other electrode. In the embodiment shown, the band-shaped fabric may be surrounded by an electrically isolating layer, which may be a fabric of dielectric material, to assure that the current flows along the band.

The product manufactured this way may e.g. be an element of a payload fairing for a launch vehicle. The objects in this figure are not to scale, in particular, the power supply, the electrodes, parts of the support structure and the paint brush might be too large or too little in comparison to the size of former 320, which might e.g. have a length of 20 meters in the case of an element of a payload fairing for a launch vehicle. The method according to the invention is suited to manufacture a variety of products of diverse dimensions, such as ship hulls, bodies of race cars, rotor wings, sporting goods, etc.

FIG. 3.b) shows the final product 300 after curing the thermosetting resin in an arrangement as shown in FIG. 3.a) and after cutting off the ends of the band-shaped fabric comprising carbon fibers.

FIG. 4 shows a cross section through a mold and a workpiece 304 in an embodiment of the method according to the invention, while letting convert the thermosetting resin to a thermoset polymer. On a base plate 401 a wooden mold 402 is arranged, which supports the workpiece 304. A cork element 403, which may be a part of the shape defining mold and/or may act as thermal protection, surrounds the outer surface of the workpiece. The wooden and the cork part of the mold are thermally insulating parts that help to keep the heat created by the current flowing through the carbon fibers in the workpiece. A cork plate 404 is arranged on the base plate to further reduce radiative heat loss toward the bottom plate. A multilayer insulation 405 covering or surrounding the mold decreases convective and radiative heat loss. The multilayer insulation 405 is spaced from the cork element of the mold by an air gap 410, which air gap can be chosen to be narrow, in order to reduce convection. The wooden mold 402 is hollow and filled with air 410. The thermal insulating elements shown in FIG. 4 could be added to an arrangement as shown in FIG. 3.a). The workpiece 304 shown here may be a composite sandwich panel structure comprising an inner face sheet, an outer face sheet and a honeycomb structure in between. In such a configuration it is sufficient to heat the inner face sheet by a current flowing through carbon fibers arranged in e.g. the inner face sheet, in order to let polymerize a thermosetting resin throughout the composite sandwich panel structure.

FIG. 5 shows a schematic cross section through a composite sandwich panel structure 500 as manufactured according to an embodiment of the method according to the invention. A core 503 is embedded in the middle of a first face sheet 501 and a second face sheet 502. Optionally, an electrically isolating layer 510 may be present between the first face sheet and the core and/or the second face sheet and the core. The first and second face sheet may be built as a stack of several plies, here symbolically displayed as three plies 520 in each of the two face sheets. Some or all the plies 520 may comprise carbon fibers, which are used for heating the sandwich construction during the manufacturing process. The face sheets of the sandwich construction shown here are symmetrical with regard to the core.

FIG. 6 shows a cutout view of a composite sandwich panel structure 600 as manufactured according to an embodiment of the method according to the invention. In the embodiment shown here, a first face sheet 601 has a completely different layer stack than a second face 602, which corresponds to the lowermost layer shown in this figure. The second face sheet 602 may only comprise a ply of carbon fiber webbing embedded in thermoset polymer. A core 603 of the composite sandwich panel structure is arranged between the first and second face sheet. In the present cutout view, the part of the core 603 shown is slightly bigger than the parts shown of the other elements in the layer stack, such that a view on the core structure 609 is possible. The core structure is symbolically displayed as cross hatching. The core structure may for example be implemented as honeycomb structure with honeycombs oriented perpendicular to the face sheets. The core structure may, as another example, be a foam structure. Part of the first face sheet and directly adjacent to the core, there is a reinforcing layer 604. The reinforcing layer may comprise carbon fibers or glass fibers embedded in a thermoset polymer. An inner electrically isolating layer 605 provides for electrical isolation of the plies 620 towards the core side. Two plies 620 comprising carbon fibers are in contact with an electrical contact element 606. The electrical contact element 606 may be arranged at an edge of the sandwich construction, such that a connection from a power supply to the carbon fibers can easily be established, either from an end face (from the right side in the present figure) or from a side orthogonal to the layers of the sandwich (from above in the present figure). In the latter case, layers above the electrical contact element may be locally removed or not be applied, in order to enable free access to the electrical contact element. An outer electrically isolating layer 607 is arranged on top of the plies 620 containing the carbon fibers. The outer electrically isolating layer 607 provides for electrical isolation towards an exterior of the composite sandwich panel structure 600. A coating 608 finishes the layer stack. The thickness of the layers in the layer stack shown in the present figure is not to scale, in particular, the thickness of the coating may be much less than the thickness of the other layers. Only a small cutout of a larger composite sandwich panel structure is shown here. The composite sandwich panel structure may extend along a curved surface, the curvature being not visible in this cutout view.

FIG. 7 shows a perspective and schematic view of a product during the manufacturing in a situation similar to FIG. 3.a). Several electrodes 311, 312, 313, 314, 315 are clamped to the carbon fibers embedded in thermosetting resin 303. The electrodes have large cross section in order to bear the clamping forces and to avoid excessive heating of the electrodes themselves, when carrying current. The electrodes have each an electrically conductive connection to a power supply 310. Current I flows across overlapping sections of plies of the carbon fibers, as symbolically indicated by several arrows. In order to achieve uniform heating in the more complex part of the product shown in the left part of this figure, an electrode configuration with electrode segments 312, 313, 314 is connected along an edge on the left side. Similarly, electrode segments 311, 315 are attached near the edge of the cylindrical part on the right side. Further electrode segments not visible may be attached on the reverse side. Individual electrode segments have their own connection to the power supply. Current, voltage or duty-cycle may be controlled individually in different electrode segments. A voltage may be applied sequentially in time to individual electrode segments. This may be achieved by using a programmable power supply 310. Heating power in different sections may be controlled in a negative feedback-loop taking into account a temperature measured in each section by a corresponding temperature sensor (not shown).

The product resulting from this embodiment of the method of manufacturing may look as the product shown in FIG. 3.*b*). The product manufactured this way may e.g. be an element of a payload fairing for a launch vehicle. The objects in this figure are not to scale, in particular, the power supply, the electrodes, parts of the support structure and the paint brush might be too large or too little in comparison to the size of former 320, which might e.g. have a length of 20 meters in the case of an element of a payload fairing for a launch vehicle. The method according to the invention is suited to manufacture a variety of products of diverse dimensions, such as ship hulls, bodies of race cars, rotor wings, sporting goods, etc.

Coming back to the electrode configurations used, there may be electrodes arranged around the perimeter of a surface containing carbon fibers or other electrically conducting fibers, in order to fine tune current injection and extraction. Such an electrode arrangement may be used in combination with any of the embodiments of the method or the device for performing the method.

LIST OF REFERENCE SIGNS

10 step of providing carbon fibers being embedded in a thermosetting resin
11 step of arranging carbon fibers
12 step of contacting electrodes
13', 13'' steps of adding thermosetting resin
20 step of heating the thermosetting resin up to its cure temperature by a current flowing through at least a part of said carbon fibers
21 step of applying voltage to electrodes
22 step of heating resin to its cure temperature
30 step of letting convert the thermosetting resin to a thermoset polymer
300 product comprising fiber reinforced polymer material
301, 302 ends of a band-shaped fabric comprising carbon fibers
303 carbon fibers embedded in thermosetting resin
304 workpiece
310 power supply
311, 312, 313, 314, 315 electrodes
320 former
330 paintbrush (indicating surface comprising resin)
401 base plate
402 wooden mold
403 cork element
404 cork plate
405 multilayer insulation
410 air
500 composite sandwich panel structure
501 first face sheet
502 second face sheet
503 core
510 electrically isolating layer (optional)
520 plies
600 composite sandwich panel structure
601 first face sheet
602 second face sheet
603 core
604 reinforcing layer
605 inner electrically isolating layer
606 electrical contact element
607 outer electrically isolating layer
608 coating
609 core structure (seen from above)
620 plie
I current

The invention claimed is:

1. A method of manufacturing a product (300) comprising fiber reinforced polymer material, the product (300) being a composite sandwich panel structure (500, 600) comprising a core (503, 603) between a first face sheet (501, 601) and a second face sheet (502, 602), the method comprising the steps of:
providing (10) carbon fibers being embedded in a thermosetting resin,
heating (20) the thermosetting resin up to its cure temperature by a current flowing through at least a part of said carbon fibers,
letting convert (30) the thermosetting resin to a thermoset polymer, wherein at least one of said first face sheet and said second face sheet comprises the carbon fibers embedded in the thermoset polymer.

2. Method according to claim 1, further comprising the preceding step of arranging said carbon fibers on a surface of a former or in a mold defining a shape of said product.

3. Method according to claim 2, wherein after heating the thermosetting resin up to its cure temperature, a structure comprising carbon fibers and partially cured resin is removed from said former or said mold.

4. Method according to claim 2, wherein carbon fibers are pre-impregnated by the thermosetting resin before arranging them on the surface of said former or in said mold.

5. Method according to claim 2, wherein after arranging the carbon fibers in said mold, thermosetting resin is injected into said mold.

6. Method according to claim 2, further comprising the step of providing said former or said mold comprising thermally insulating material and/or covering said former or said mold with a multilayer insulation.

7. Method according to claim 6, wherein the thermally insulating material is one or more of wood, cork, ceramics, glass, mineral wool, or polymer foam.

8. Method according to claim 1, further comprising the preceding step of bringing distant sections of said part of carbon fibers into electrically conducting contact with electrodes of a power supply.

9. Method according to claim 8, wherein said electrodes are clamped to said carbon fibers.

10. Method according to claim 9, wherein said electrodes are of a solid bar construction.

11. Method according to claim 8, wherein said electrodes have the form of metallic filaments being woven into a fabric comprising said carbon fibers.

12. Method according to claim 11, wherein the metallic filaments are arranged in orthogonal direction to said carbon fibers.

13. Method according to claim 8, wherein said carbon fibers are arranged in multiple plies and the plies are connected in parallel to the power supply.

14. Method according to claim 1, wherein the carbon fibers are provided in form of a band-shaped fabric comprising carbon fibers at least in a longitudinal direction.

15. Method according to claim 14 for manufacturing a laminate structure, the method comprising the step of arranging said band-shaped fabric parallel to a surface of the laminate structure and covering said surface.

16. Method according to claim 1, wherein said at least one of said first face sheet and said second face sheet comprises an electrically insulating layer (510, 605, 607) between said carbon fibers and said core and/or between said carbon fibers and an exterior of said structure.

17. Method according to claim 1, wherein said core (503, 603) is electrically non-conductive.

18. Method according to claim 1, wherein said structure comprises at its surface electrical contact elements (606), said electrical contact elements being in electrical contact with said carbon fibers and being designed as solid bar constructions.

19. Method according to claim 1, wherein said structure comprises at its surface electrical contact elements (606), said electrical contact elements being in electrical contact with said carbon fibers and said electrical contact elements comprising electrically conducting fibers.

20. Method according to claim 1 wherein said structure comprises edge reinforcements built as monolithic construction comprising glass fibers and electrically conducting fibers.

21. Device for performing the method according to claim 1, comprising
    a former or a mold comprising thermally and electrically insulating material,
    electrodes for connecting carbon fibers to a power supply, the electrodes being arranged on the former or in the mold.

22. A composite sandwich panel structure (500, 600) manufactured according to claim 1.

23. A composite sandwich panel structure manufactured according to claim 22, the structure comprising an inner face sheet, a honeycomb structure and an outer face sheet, all of which comprising a thermoset polymer, wherein carbon fibers are arranged to follow a path uniformly covering the inner and/or the outer face sheet.

* * * * *